US012602168B2

(12) United States Patent
Xu et al.

(10) Patent No.: US 12,602,168 B2
(45) Date of Patent: Apr. 14, 2026

(54) OPERATION METHODS OF MEMORY SYSTEMS, MEMORY CONTROLLERS, MEMORY SYSTEMS, AND STORAGE MEDIUMS

(71) Applicant: Yangtze Memory Technologies Co., Ltd., Wuhan (CN)

(72) Inventors: Yin Xu, Wuhan (CN); Youxin He, Wuhan (CN); Jiangwei Shi, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/764,836

(22) Filed: Jul. 5, 2024

(65) Prior Publication Data

US 2025/0173063 A1     May 29, 2025

(30) Foreign Application Priority Data

Nov. 28, 2023    (CN) .......................... 202311624688.6

(51) Int. Cl.
*G06F 3/06* (2006.01)

(52) U.S. Cl.
CPC .......... *G06F 3/0616* (2013.01); *G06F 3/0659* (2013.01); *G06F 3/0679* (2013.01); *G06F 2212/7211* (2013.01)

(58) Field of Classification Search
CPC .... G06F 3/0616; G06F 3/0659; G06F 3/0679; G06F 2212/7211
See application file for complete search history.

(56) References Cited

U.S. PATENT DOCUMENTS

| | | | |
|---|---|---|---|
| 2017/0262365 A1* | 9/2017 | Kanno | G06F 3/0679 |
| 2020/0183588 A1* | 6/2020 | Lee | G06F 3/0649 |
| 2024/0345951 A1* | 10/2024 | Cariello | G06F 12/0246 |

\* cited by examiner

*Primary Examiner* — Kalpit Parikh
(74) *Attorney, Agent, or Firm* — Hanley, Flight & Zimmerman, LLC

(57) ABSTRACT
The present disclosure provides a method of operating a memory system, a memory controller, a memory system, and a storage medium, and relates to the technical field of semiconductor chips. The method includes: obtaining an erase count and a hot id of each virtual block, determining a first virtual block from which data is moved and a second virtual block into which the data is moved according to the erase count and the hot id of each virtual block, and moving data stored in the first virtual block to the second virtual block. The method of operating a memory system provided by the present disclosure is intended to improve the problem that the service life of a solid state drive is shorten due to the movement of newly-written data.

20 Claims, 14 Drawing Sheets determining, as the first virtual block, the virtual block with an erase count being less than a first threshold and a hot id, wherein a difference between the hot id and the max hot id is greater than a second threshold ⟋ S201 determining, as the second virtual block, the virtual block with an erase count being greater than a third threshold ⟋ S202

Second data information

| Max hot id | |
|---|---|
| VBα | HOT IDα |
| VB1 | HOT ID1 |
| VB2 | HOT ID2 |
| VB3 | HOT ID3 |
| VB4 | HOT ID4 |
| VB5 | HOT ID5 |
| VB6 | HOT ID6 |
| VB7 | HOT ID7 |

First data information

| | |
|---|---|
| VBα | ECα |
| VB1 | EC1 |
| VB2 | EC2 |
| VB3 | EC3 |
| VB4 | EC4 |
| VB5 | EC5 |
| VB6 | EC6 |
| VB7 | EC7 |

FIG. 9 determining, as the first virtual block, the virtual block with an erase count being less than a first threshold and a hot id, wherein a difference between the hot id and the max hot id is greater than a second threshold ⟋ S201 determining, as the second virtual block, the virtual block with an erase count being greater than a third threshold ⟋ S202

OPERATION METHODS OF MEMORY SYSTEMS, MEMORY CONTROLLERS, MEMORY SYSTEMS, AND STORAGE MEDIUMS

CROSS REFERENCE TO RELATED APPLICATION

This application claims priority to and the benefit of Chinese Patent Application 202311624688.6, filed on Nov. 28, 2023, which is hereby incorporated by reference in its entirety.

TECHNICAL FIELD

The present disclosure relates to the technical field of semiconductor chips, and particularly to methods of operating memory systems, memory controllers, memory systems, and storage mediums.

BACKGROUND

The service life of a solid state drive (SSD) depends on the number of times that a block is erased, and the number of times of writing data for each block is limited.

BRIEF DESCRIPTION OF THE DRAWINGS

FIG. 9 is a schematic diagram of storage information provided by examples of the present disclosure;

DETAILED DESCRIPTION

Figure 1:
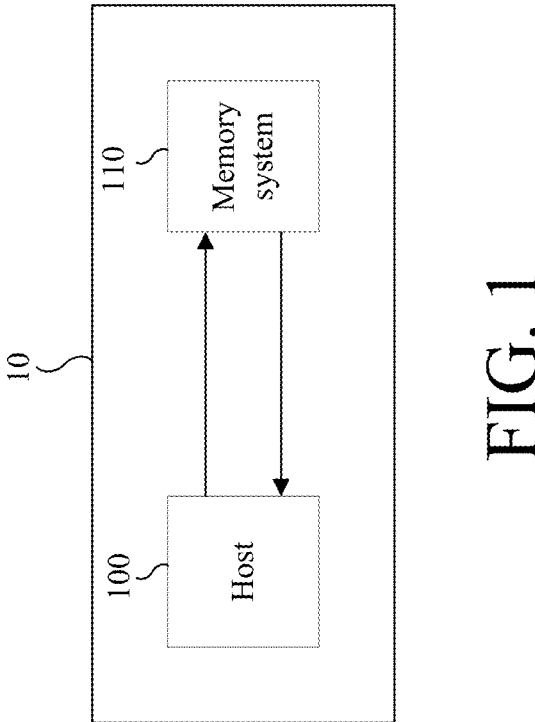
FIG. 1 is a schematic diagram of an electronic apparatus provided by examples of the present disclosure.

The technical solutions in some examples of the present disclosure will be described below clearly and completely in conjunction with the drawings. Apparently, the examples described are only part of, but not all of, the examples of the present disclosure. All other examples obtained by those of ordinary skills in the art based on the examples provided by the present disclosure shall fall in the scope of protection of the present disclosure.

Unless otherwise specified in the context, throughout the specification and the claims, the term "comprise" is interpreted as an open and inclusive meaning, i.e., "including, but not limited to". In the description of the specification, the terms "one example", "some examples", "an example", or "in an example", etc. are intended to indicate that particular features, structures, materials, or characteristics related to the example are included in at least one example of the present disclosure. The schematic representation of the above terms may not necessarily refer to the same example. Furthermore, these particular features, structures, materials, or characteristics may be included in one or more examples in any suitable manner.

In the following, the terms "first" and "second" are only for the purpose of description, and cannot be construed as indicating or implying relative importance or implicitly indicating the number of indicated technical features. Thus, features defined by "first" and "second" may explicitly or implicitly include one or more of such features. In the description of the examples of the present disclosure, "a plurality of" means two or more, unless otherwise stated.

In describing some examples, expressions of "coupled" and derivatives thereof may be used. For example, the term "coupled" may be used in the description of some examples to indicate that two or more components have a direct physical contact or an electrical contact. In this case, "coupled" may be also described as "connected". Moreover, the term "coupled" may also mean that two or more components have no direct contact with each other, but still collaborate or interact with each other. The examples disclosed herein are not necessarily limited to the content herein.

"At least one of A, B and C" and "at least one of A, B or C" have the same meaning, both including the following combinations of A, B and C: A alone, B along, C alone, a combination of A and B, a combination of A and C, a combination of B and C, and a combination of A, B and C.

"A and/or B" includes the following three combinations: A alone, B alone, and a combination of A and B. The use of "suitable for" or "configured to" herein means open and inclusive language, and does not exclude an apparatus suitable for performing or configured to perform additional tasks or steps. In addition, the use of "based on" means openness and inclusiveness, as processes, steps, calculations, or other actions "based on" one or more conditions or values may be based on an additional condition or exceeded value in practice.

The use of "configured to" herein means open and inclusive language, and does not exclude an apparatus suitable for performing or configured to perform additional tasks or steps.

It is easier to permanently damage a block by continuously writing and erasing the same block, thus shortening the service life of the solid state drive. In order to avoid the occurrence of this situation, a wear leveling (WL) algorithm is employed to perform erase and write operations on all the blocks evenly.

Examples of the present disclosure provide an electronic apparatus that may be, for example, any one of a cellphone, a desktop computer, a tablet computer, a notebook computer, a server, a vehicle apparatus, a wearable apparatus (e.g., a smart watch, a smart bracelet, smart glasses, etc.), a mobile power supply, a gaming machine, a digital multimedia player, etc. Referring to FIG. 1, FIG. 1 shows a schematic diagram of the electronic apparatus 10 provided by examples of the present disclosure. The electronic apparatus comprises a host 100 and a memory system 110, the host 100 is coupled with the memory system 110 to write data to the memory system 110 or read data stored in the memory system 110, wherein the host is also known as a master apparatus, and the memory system is also known as a slave apparatus. In the electronic apparatus, the slave apparatus may be accessed by different master apparatuses, for example, the electronic apparatus is a cellphone, a central processing unit (CPU), a digital signal processor (DSP), and the like of the cellphone may all be used as the hosts to access the memory system.

Figure 2:
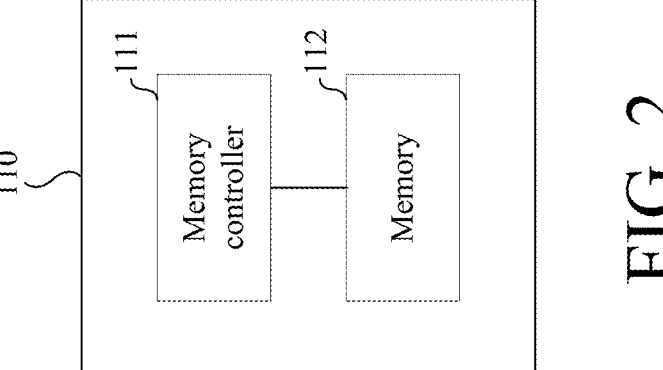
FIG. 2 is a schematic diagram of a memory system provided by examples of the present disclosure.

In an example, with reference to FIG. 2, FIG. 2 shows a schematic diagram of the memory system 110 provided by the examples of the present disclosure. The memory system 110 comprises a memory controller 111 and a memory 112, wherein the memory controller 111 is coupled to the memory 112 to control the memory 112 to store data. The memory 112 may be a 2-dimensional (2D) memory or a 3-dimensional (3D) memory.

The memory system 110 may be integrated into various types of storage apparatuses, for example, be included in the same package (e.g., a Universal Flash Storage (UFS) package or an Embedded Multi Media Card (eMMC) package). That is, the memory system 110 may be applied to and packaged into different types of electronic products, for example, a mobile phone (e.g. a cellphone), a desktop computer, a tablet computer, a notebook computer, a server, a vehicle apparatus, a gaming console, a printer, a positioning apparatus, a wearable apparatus, a smart sensor, a mobile power supply, a virtual reality (VR) apparatus, an augmented reality (AR) apparatus, or any other suitable electronic apparatuses having memories therein.

In some examples, the memory system 110 comprises a memory controller 111 and one memory 112, and may be integrated into a memory card. The memory card comprises any one of a personal computer memory card international association (PCMCIA) card (a PC card for short), a compact flash (CF) card, a smart media (SM) card, a memory stick, a multi media card (MMC), a secure digital (SD) memory card, and a UFS.

Figure 3:
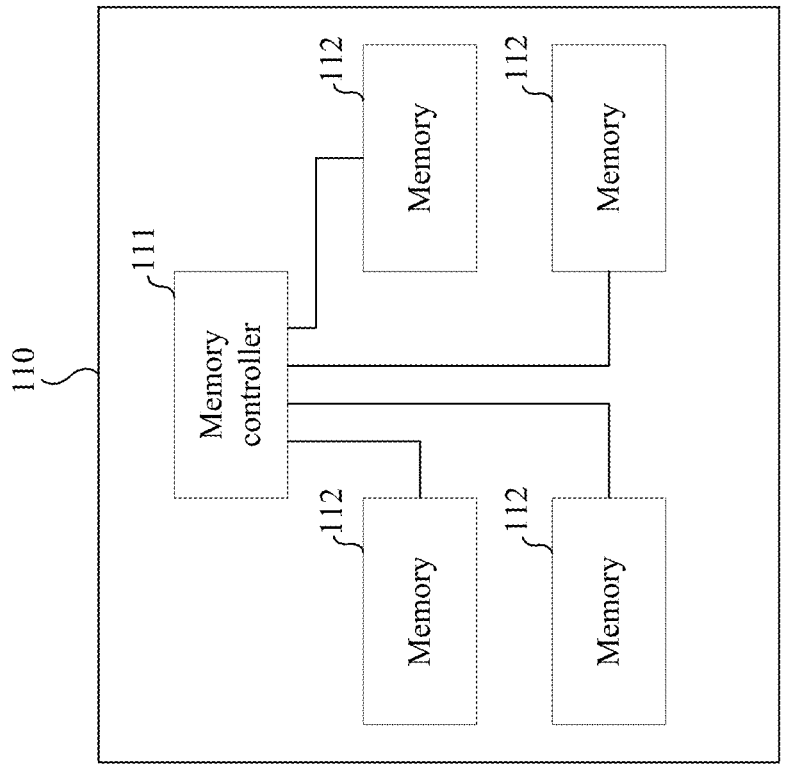
FIG. 3 is a schematic diagram of another memory system provided by examples of the present disclosure.

In some other examples, referring to FIG. 3, the memory system 110 comprises a memory controller 111 and a plurality of memories 112, and is integrated into a solid state drive (SSD).

In the memory system 110, in some examples, the memory controller 111 is configured for operating in a low duty-cycle environment, such as SD cards, CF cards, universal serial bus (USB) flash drives, or other media for use in electronic apparatuses, such as personal computers, digital cameras, mobile phones, etc.

In some other examples, the memory controller 111 is configured for operating in a high duty-cycle environment like SSDs or eMMCs used as data memories for mobile apparatuses, such as smartphones, tablet computers, notebook computers, etc., and enterprise memory arrays.

In some examples, the memory controller 111 may be configured to manage data stored in the memories 112 and communicate with an external apparatus (e.g., the host 100). In some examples, the memory controller 111 may further be configured to control operations of the memories 112, such as read, erase, and program operations. In some examples, the memory controller 111 may further be configured to manage various functions with respect to data stored or to be stored in the memories 112, comprising at least one of bad-block management, garbage collection (GC), logical-to-physical address conversion, and wear leveling (WL). In some examples, the memory controller 111 is further configured to process error correction codes with respect to the data read from or written to the memories 112.

Moreover, the memory controller 111 may communicate with the external apparatus (e.g., the host 100) through at least one of various interface protocols. The interface protocols comprise at least one of a universal serial bus (USB) protocol, a microsoft management console (MMC) protocol, a peripheral component interconnect (PCI) protocol, a peripheral component interconnect express (PCI-E) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronic (IDE) protocol and a firewire protocol.

The memory system 110 provided by the present disclosure may be integrated into a solid state drive (SSD); the service life of the solid state drive is a very important concern; in order to make the solid state drive have a longer life cycle, an un-leveling erase phenomenon may be avoided; the un-leveling erase phenomenon means that some blocks rapidly become bad blocks caused by frequent erase while other blocks are hardly erased, and thus the overall life cycle of the solid state drive is shortened caused by increased bad blocks.

Figure 4:
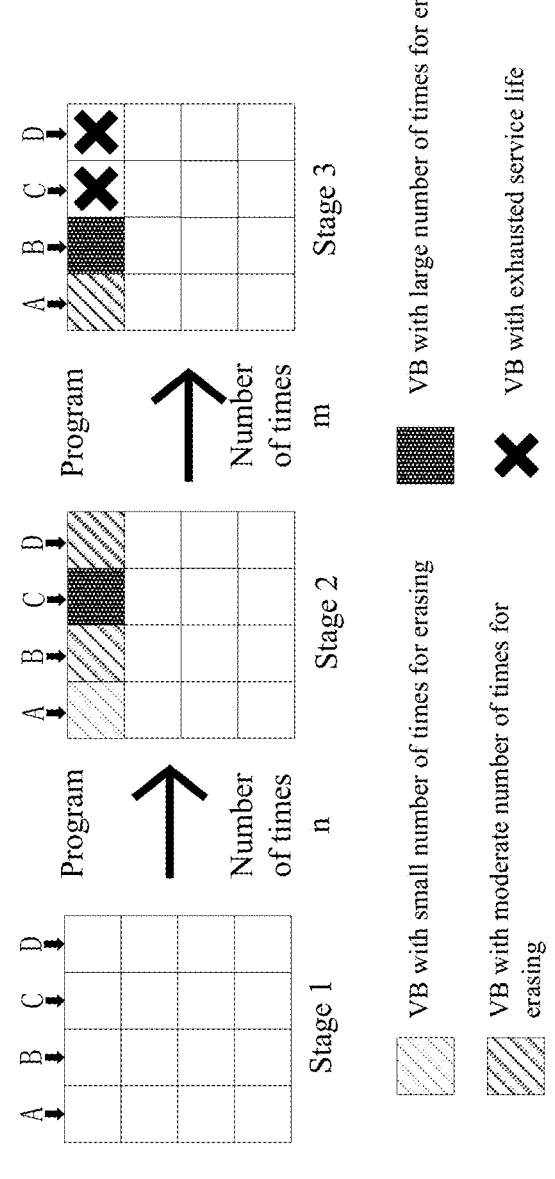
FIG. 4 is a schematic diagram of a wear process of a virtual block provided by examples of the present disclosure.

In an example, referring to FIG. 4, the use of the solid state drive may be divided into several phases, such as Phase 1, Phase 2, and Phase 3 shown in FIG. 4, according to a use duration (or the number of times for erasing) of the solid state drive, the use duration of the solid state drive from the Phase 1 to the Phase 3 is extended, and the number of times for erasing is increased.

When the solid state drive is at the Phase 1, that is, the use duration of the solid state drive is shorter, the number of times for programing is less, the number of times of executing an erase operation is also less, and it is assumed that erase counts (ECs) of virtual blocks (VBs) numbered A, B, C, and D at this phase are all 0. The virtual block may comprise at least one block in the memory, for example, the virtual block may be constituted by blocks that are physically located in the same position on all flash chips in the memory.

As the use duration of the solid state drive extends, the number of times for programing continuously increases, and then the use of the solid state drive enters the Phase 2. During this process, the erase count of the virtual block continuously increases as the data is written, however the probability that different virtual blocks are used for storing newly-written data is different, resulting in large difference in values by which the erase counts of different virtual blocks are increased, i.e., a situation that one portion of the virtual blocks may be frequently used, and the other portion of the virtual blocks are less used.

For example, when the solid state drive is in a state of the Phase 2, the erase count of the virtual block numbered C is far greater than the erase counts of the virtual blocks numbered B and D, and the erase counts of the virtual blocks numbered B and D are far greater than the erase count of the virtual block numbered A.

As the use duration of the solid state drive further extends, the number of times for programing continuously increases accordingly, and then the use of the solid state drive enters the Phase 3. At the Phase 2, the frequently-used virtual blocks may be continuously frequently used, and finally becomes bad blocks caused by the excessive erase counts of the virtual blocks, resulting in exhaustion of the service life, and those virtual blocks with small erase counts at the Phase 3 still have relatively-long service life.

For example, the erase counts of the virtual blocks numbered C and D exceed a preset threshold, and become the bad blocks due to the exhausted service life, and the erase counts of the virtual blocks numbered B and A are also at a high value. It can be seen that, in the above-mentioned solutions, in addition to the virtual blocks numbered A, B, C, and D being in a state of being continuously used, other virtual blocks are all in an unused state, and there is a huge difference in the erase counts of different virtual blocks, resulting in great reduction in the service life and performance of the solid state drive.

In order to make the solid state drive have a longer life cycle, in an implementation, a wear leveling algorithm is employed to solve the above-mentioned problem. An implementation principle of the wear leveling algorithm is to select a source virtual block (SVB) and a target virtual block (TVB) from the virtual blocks, and then move data in the source virtual block to the target virtual block, so as to set the source virtual block from a use state to an idle state, and set the target virtual block to a use state, such that the source virtual block in the idle state may be configured to store the newly-written data, and since the target virtual block is set to the use state, the target virtual block is not configured to store the newly-written data. A selection condition for the source virtual block is the virtual block that has the erase count being less than the preset threshold and is in the use state. A selection condition for the target virtual block is the virtual block that has the erase count being greater than the preset threshold and is in the idle state.

Through the wear leveling algorithm, the probability that the target virtual block with large erase count is continuously configured to store the newly-written data may be reduced, and the probability that the source virtual block with small erase count is configured to store the newly-written data is increased. The difference between the erase counts of the source virtual block and the target virtual block gradually reduces, such that the erase counts of different virtual blocks are in a leveling state.

Figure 5:
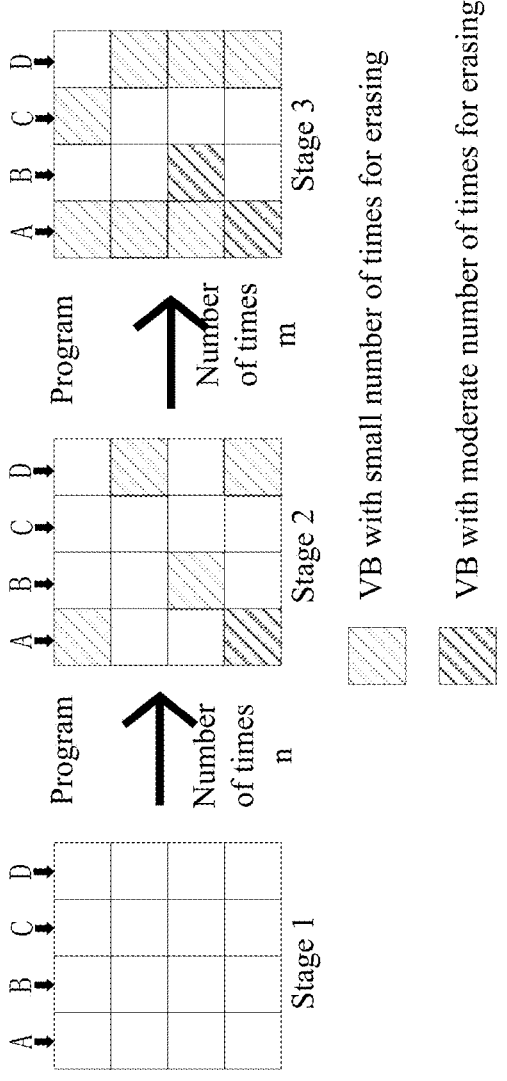
FIG. 5 is a schematic diagram of a wear process of another virtual block provided by examples of the present disclosure.

In an example, referring to FIG. 5, when the wear leveling algorithm is employed, and the solid state drive is at the Phase 1, i.e., the solid state drive is in a freshly-used state, the erase counts of the virtual blocks numbered A, B, C, and D are all 0.

Continuously referring to FIG. 5, as the solid state drive is continuously used, the number of times for programing continuously increases, and then the use of the solid state drive enters the Phase 2. The erase count of the virtual block continuously increases, however the probability that different virtual blocks are used for storing the newly-written data is close, such that there is no large difference in the values by which the erase counts of different virtual blocks are increased, i.e., the erase counts of all the virtual blocks are close. For example, the erase count of the virtual block numbered A is slightly greater than the erase counts of the virtual blocks numbered B, C, and D.

Continuously referring to FIG. 5, as the number of times for programing continuously increases, the use of the solid state drive enters the Phase 3, there is a probability that the erase counts of all the virtual blocks increase, i.e., the erase counts of the virtual blocks other than the virtual blocks numbered B, C, and D also increase. For example, the erase counts of the virtual blocks numbered A and C are slightly greater than the erase counts of the virtual blocks numbered B and D.

It can be seen that, in the above-mentioned solutions, not only are the erase counts of the virtual blocks numbered A, B, C, and D in the use state, but the other virtual blocks are also in the use state, such that the situation that the erase counts of some virtual blocks exceed the preset threshold to make the service life of the virtual blocks exhausted will not happen. Therefore, the erase counts of different virtual blocks may be balanced by employing the wear leveling algorithm, thereby extending the service life of the solid state drive.

During a process of using the wear leveling algorithm, the virtual block storing hot data is selected as the source virtual block, and when the hot data stored in the source virtual block is moved into the target virtual block, due to the movement of the hot data, the erase count in the target virtual block may be increased abnormally, and write amplification increases.

The examples of the present disclosure provide a solution, comprising: taking each virtual block as a unit, assigning a hot id for each virtual block when a new virtual block is to be occupied for storing the newly-written data, and determining a hot type of data stored in the virtual block on the basis of the value of the hot id.

Figure 6:
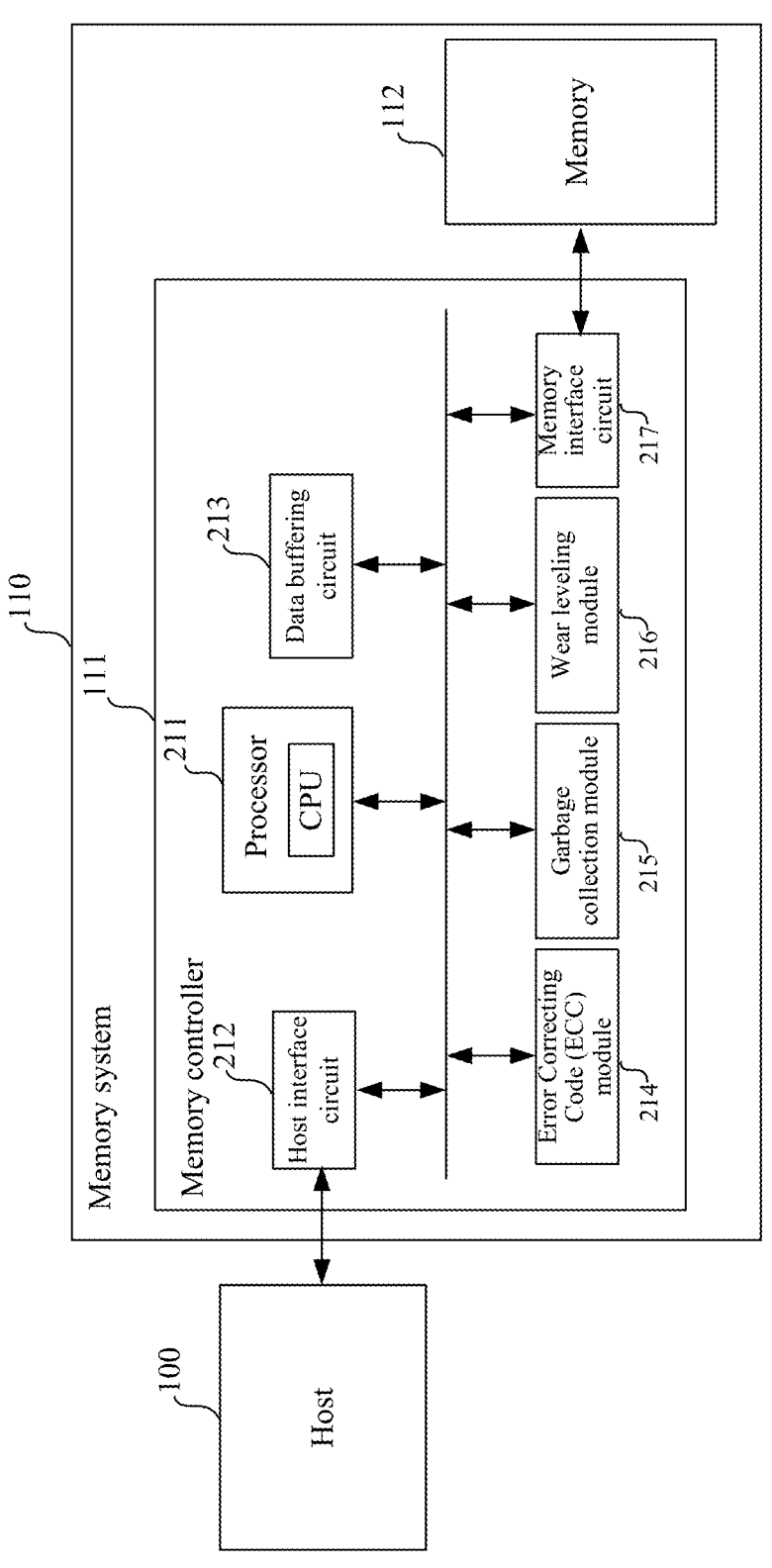
FIG. 6 is a schematic diagram of a memory controller provided by examples of the present disclosure.

FIG. 6 shows a schematic diagram of the memory controller 111 provided by the examples of the present disclosure; the memory controller 111 may comprise a processor 211, a host interface circuit 212, a data buffering circuit 213, an Error Correcting Code (ECC) module 214, a garbage collection module 215, a wear leveling module 216, and a memory interface circuit 217.

The processor 211 may communicate with the host 100 through the host interface circuit 212, and execute logic operations to control operations of the memory controller 111. For example, the processor 211 may load a program command, a data file or a data structure in response to a request received from the host 100 or an external device, so as to execute various operations or generate commands or addresses. For example, the processor 211 may generate various commands for executing a program operation, a read operation, an erase operation, and a parameter setting operation. In some possible examples, the processor 211 may generate commands without a request from the host 100, for example, the processor 211 may generate a command for a background operation such as a garbage collection operation of the memory 112.

The error correcting code module 214 may execute error detection and correction functions on read data read from the memory 112. For example, the error correcting code module 214 may generate a parity bit for write data to be written to the memory 112, and the generated parity bit may be stored in the memory 112 together with the write data. When the data is read from the memory 112, the error correcting code module 214 may correct an error in the read data by using the parity bit read from the memory 112 together with the read data, and may output the read data after error correction.

The host interface circuit 212 may send or receive data or commands to or from the host 100, such as instructions sent from the host 100 to the host interface circuit 212, the data to be written to the memory 112, etc., and responses of the instructions sent from the host interface circuit 212 to the host 100, the data to be read from the memory 112, etc. The host interface circuit 212 may further comprise protocols for exchanging data between the host 100 and the memory controller 111. For example, the host interface circuit 212 may communicate with the host 100 through at least one of the following various interface protocols, such as a universal serial bus protocol, a microsoft management console protocol, a peripheral component interconnect protocol, a PCI express protocol, an advanced technology attachment protocol, a serial ATA protocol, a parallel ATA protocol, a small computer system interface protocol, an enhanced small device interface protocol, an integrated drive electronic protocol, a firewire protocol, etc.

The memory interface circuit 217 may communicate with the memory 112 using a communication protocol according to control of the processor 211, comprising communication of commands, addresses and data, and the memory interface circuit 217 may send data to be written to the memory 112 to the memory 112, or may receive data read from the memory 112; and the memory interface circuit 217 may be implemented to conform to standard protocols such as toggle or open NAND flash interface (ONFI). In an example, by using the ONFI protocol as an example, the memory controller 111 may be connected with the memory 112 through an ONFI bus.

Figure 7:
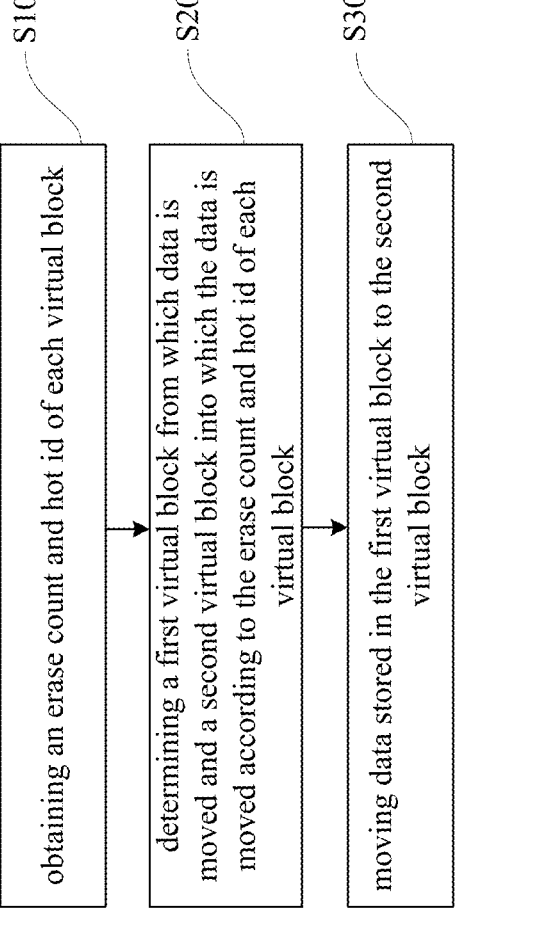
FIG. 7 is a flow diagram of a method of operating a memory system provided by examples of the present disclosure.

In an example, the above-mentioned processor 211, when operating, executes the operation method shown in FIG. 7; the operation method comprises S10 to S30; and the processor 211 may execute the operation method comprising S10 to S30.

S10, obtaining an erase count and hot id of each virtual block.

The processor monitors each of the virtual blocks through an erase count table (ECT), and searches for the virtual block with the minimum erase count in a block pool and the virtual block with the maximum erase count in an idle pool. The block pool may be constituted by the virtual blocks storing valid data, i.e., the block pool is constituted by the virtual blocks in a non-idle state; and the idle block pool may be constituted by the virtual blocks not storing the valid data, i.e., the idle block pool is constituted by the virtual blocks in an idle state.

After the erase count of each virtual block is obtained, whether a triggering condition of a data movement operation is met is determined.

In an implementation, a relationship between a difference between the maximum erase count and the minimum erase count of the virtual block and a fourth threshold is determined; and in response to the difference between the maximum erase count and the minimum erase count of the virtual block being greater than the fourth threshold, the first virtual block from which data is moved and the second virtual block into which the data is moved are determined.

In an example, the maximum erase count in the idle pool is subtracted from the minimum erase count in the block pool; and if the minimum erase count and the maximum erase count meet a relationship corresponding to a Formula 1, the data movement operation may be triggered.

$$EC_{min\ used\ VB} < EC_{max\ free\ VB} - EC_{gap\ TH} \qquad (1)$$

In the formula, $EC_{min\ used\ VB}$ represents an erase count of the block with the minimum erase count in the block pool, $EC_{max\ free\ VB}$ represents an erase count of the block with the maximum erase count in the idle pool, and $EC_{gap\ TH}$ represents a preset fourth threshold.

After the data movement operation is triggered, the virtual blocks from which data is moved and the virtual blocks into which data is moved are selected according to the erase count and hot id of each virtual block.

In the solid state drive, when a new virtual block is to be occupied each time, the virtual block may be erased firstly, and then written with new data. The erase count is a value that records the number of times each virtual block is erased. The erase count may be used for representing the service life of the virtual block; and the smaller the erase count is, it indicates that the fewer the number of times the virtual block is used, such that the service life of the virtual block is relatively long. Otherwise, the greater the erase count is, it may indicate that the virtual block has been used for a plurality of times, such that the service life of the virtual block is relatively short. The hot id may continuously be accumulated as the number of times for writing data increases, such that a hot degree of the data stored in the virtual block may be determined according to a difference relationship between the hot id and a preset threshold.

S20, determining a first virtual block from which data is moved and a second virtual block into which the data is moved according to the erase count and hot id of each virtual block.

The first virtual block may be the source virtual block in the wear leveling algorithm, and the second virtual block may be the target virtual block in the wear leveling algorithm; after the erase count and hot id of each virtual block are obtained, the erase count and the hot id are used together as a selection condition, such that the first virtual block and the second virtual block are respectively selected from the block pool and the idle pool, and the target virtual block is selected to receive the data from the source virtual block, so as to realize wear leveling between the virtual blocks. The first virtual block and the second virtual block are located in different pools, the first virtual block belongs to the block pool, and the second virtual block is located in the idle pool. When the first virtual block is selected, the selection may be performed according to both of a relationship between the erase count and the preset threshold, and a relationship between the difference between the hot id and the max hot id and the preset threshold. When the second virtual block is selected, the selection may be performed according to the relationship between the erase count and the preset threshold.

S30, moving data stored in the first virtual block to the second virtual block.

Data movement refers to a process that the data stored in the first virtual block is replicated and divided into the second virtual block. This may be implemented by data transmission methods such as physical data replication, logical data movement, etc. The use of different virtual blocks on an apparatus may be leveled by moving the data from the virtual block (the first virtual block) with less wear to the virtual block (the second virtual block) with more wear. When data movement is performed, in order to ensure the consistency and integrity of the data, i.e., the data shall not be lost or damaged during a replication or moving process, after movement is completed, the first virtual block may be erased and divided into the idle pool, and since data has been stored in the second virtual block, the second virtual block may be divided into the block pool.

In the present disclosure, the possibility of moving hot data stored in the virtual blocks is reduced by selecting the source virtual block based on the erase count and the hot id, and hot types of data may be accurately distinguished through the hot id, such that the possibility that invalid increases in the erase counts of the virtual blocks with greater erase counts due to the storage of newly-written hot data is reduced, thereby extending the service life of the solid state drive.

Figure 8:
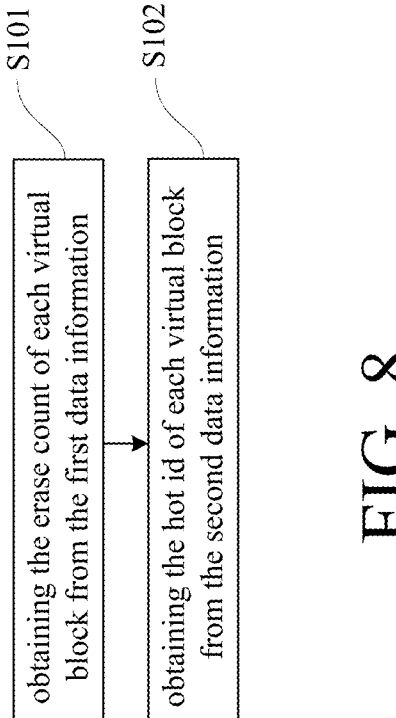
FIG. 8 is a flow diagram of another method of operating a memory system provided by examples of the present disclosure.

Referring to FIG. 8, in an implementation, when the erase count and hot id of each virtual block are obtained, S10 may comprise the following manners.

S101: obtaining the erase count of each virtual block from the first data information.

The first data information is a data set containing the erase counts of all the virtual blocks. The first data information may be stored in a buffer of the memory controller, and is regularly backed up to the memory. For example, the first data information may be an erase count table, and the erase counts of all the virtual blocks are recorded through the erase count table. The erase count table is a data structure in the memory system, and is used for tracking the number of times of an erase operation of each virtual block. The erase count table is used for managing and monitoring the service life and health states of the blocks, and each entry in the erase count table is associated with one virtual block, and records the erase count of the virtual block. The erase count table is updated in real time, i.e., every time the virtual block executes the erase operation, the erase count of the corresponding virtual block is increased.

In an example, referring to FIG. 9, in the first data information shown on a left side in FIG. 9, VBα represents an id of a virtual block, and ECα represents an erase count of a virtual block, i.e., the erase count of VB1 is EC1, the erase count of VB2 is EC2 . . . . Thus, the id of the virtual block is taken as an index, and the erase count corresponding to each virtual block may be obtained by traversing the first data information.

S102: obtaining the hot id of each virtual block from the second data information.

The second data information is a data set containing the hot ids of all the virtual blocks. The second data information may be stored in the buffer of the memory controller, and is regularly backed up to the memory. For example, the second data information may be a hot id table, and the hot ids of all the virtual blocks are recorded through the hot id table. Each entry in the hot id table is associated with one virtual block, and records the hot id of the virtual block. The hot id table is updated in real time, i.e., every time the virtual block is written with data, the hot id of the virtual block is increased.

In an example, referring to FIG. 9, in the second data information shown on a right side in FIG. 9, VBα represents the id of the virtual block, and HOT IDα represents the hot id of the virtual block, i.e., the hot id of the VB1 is HOT ID1, the hot id of the VB1 is HOT ID2 . . . . Thus, the id of the virtual block is taken as the index, and the hot id corresponding to the virtual block may be obtained by traversing the second data information.

The hot id of the virtual block is updated while the data is written; and in order to determine a hot degree of the data written to the virtual block according to the hot id, the latest hot id, i.e., the max hot id may also be considered during the determination.

In an implementation, in the second data information shown in FIG. 9, the max hot id is also stored, and the max hot id is the maximum in all of the hot ids.

In an implementation, the max hot id may not be stored in the second data information as well, and by traversing the second data information, the maximum one in all the hot ids is determined as the max hot id.

Figure 10:
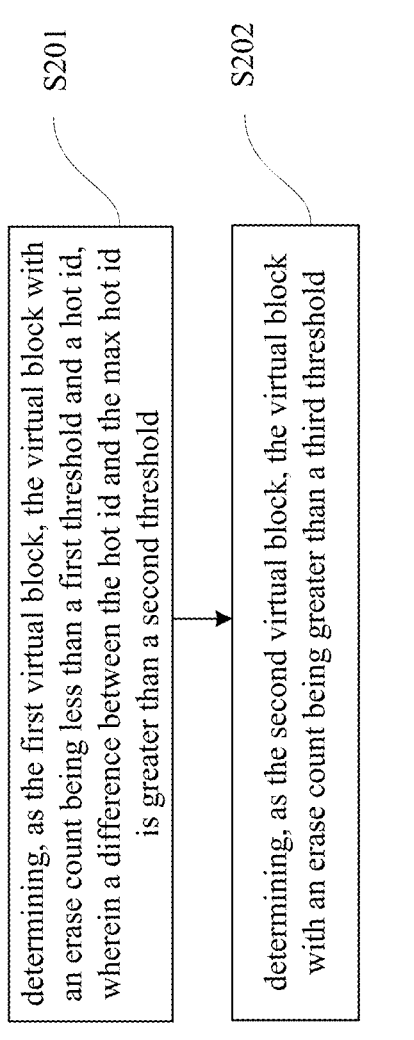
FIG. 10 is a flow diagram of another method of operating a memory system provided by examples of the present disclosure.

Referring to FIG. 10, in an implementation, S20 may comprise the following manners in case that the first virtual block from which data is moved and the second virtual block into which the data is moved are determined.

S201: determining, as the first virtual block, the virtual block with an erase count being less than a first threshold and a hot id, wherein a difference between the hot id and the max hot id is greater than a second threshold.

When the first virtual block is selected, all the virtual blocks belonging to the block pool may be selected, and the selection condition comprises the erase count and the hot id. Then the virtual blocks in the block pool that meets the selection condition are selected according to the selection condition.

Figure 11:
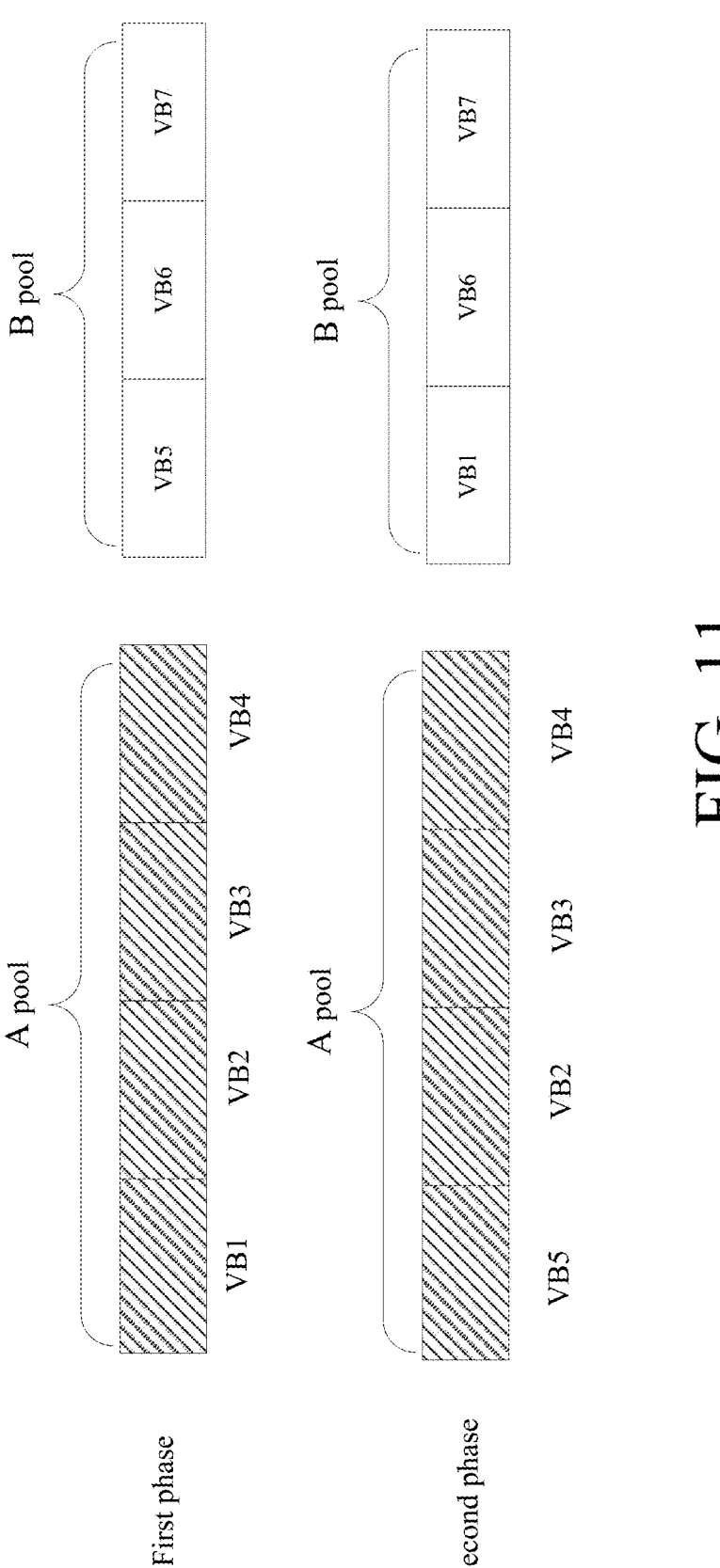
FIG. 11 is a schematic diagram of a process of selecting a virtual block provided by examples of the present disclosure.
Figure 12:
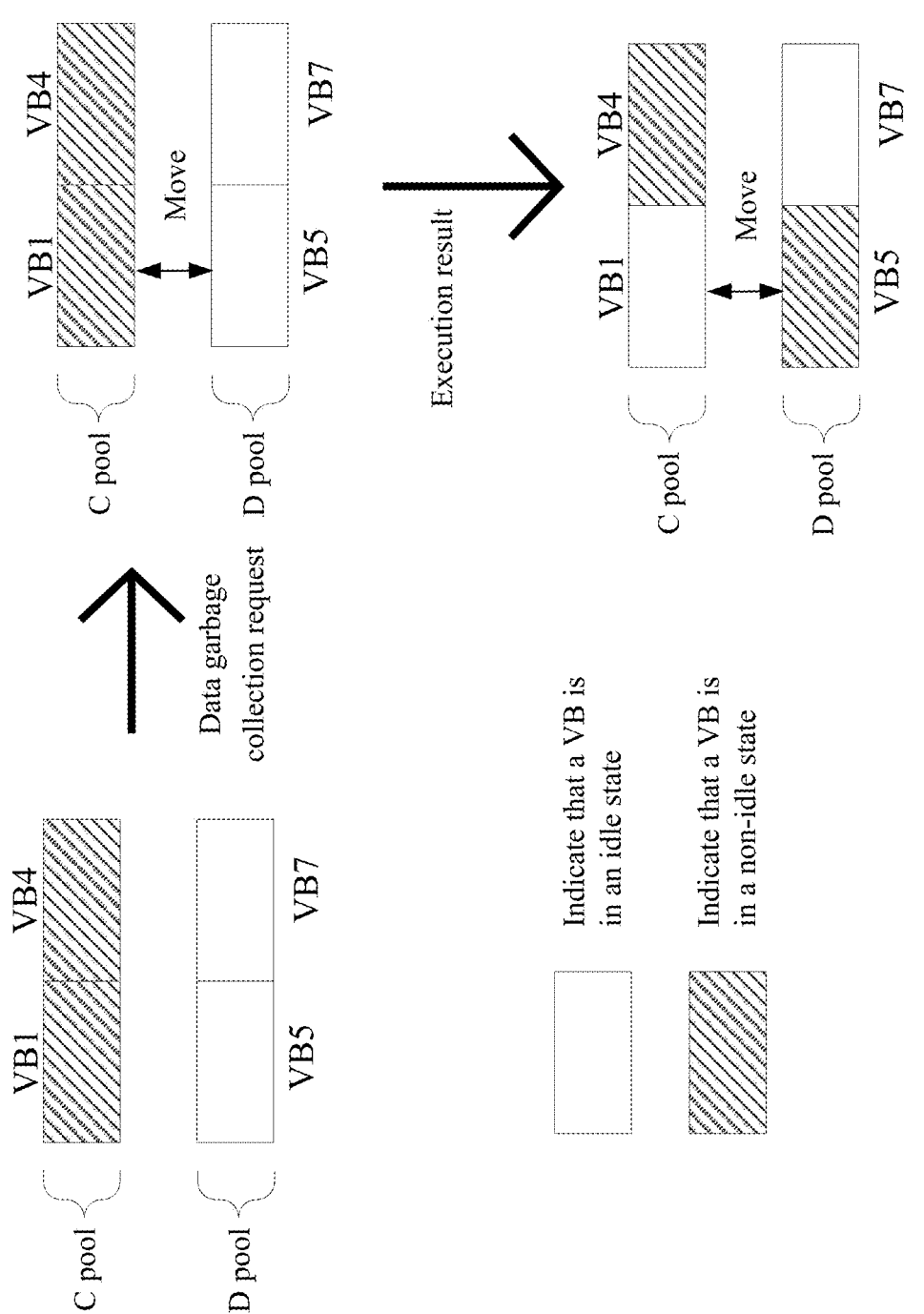
FIG. 12 is a schematic diagram of a data garbage collection process provided by examples of the present disclosure.

In an example, referring to FIG. 11 and FIG. 12, at a first phase, i.e., before data movement is performed, the virtual blocks VB1, VB2, VB3, and VB4 all belong to the block pool (A pool) because the virtual blocks store data. Then, the virtual blocks VB1, VB2, VB3, and VB4 in the block pool are selected according to a relationship between the erase count of the virtual block and the first threshold, and a relationship between the difference between the hot id of the virtual block and the max hot id and the second threshold. The first threshold is a difference between the erase count of the block with the maximum erase count in the idle pool (B pool) and a preset threshold.

For example, the erase count ($EC_{max\ free\ VB}$) of the block with the maximum erase count in the idle pool (B pool) may be 140, the preset threshold ($EC_{gap\ TH}$) may be 40, then the first threshold may be 100, and the second threshold may be 2600; the erase count of the virtual block VB1 is 40, and the difference between the hot id and the max hot id is 3800; the erase count of the virtual block VB2 is 150, and the difference between the hot id and the max hot id is 4500; the erase count of the virtual block VB3 is 60, and the difference between the hot id and the max hot id is 1500; and the erase count of the virtual block VB4 is 100, and the difference between the hot id and the max hot id is 3500. The erase count of the virtual block VB2 is greater than the first threshold, and the difference between the hot id of the virtual block VB3 and the max hot id is less than the second threshold, such that the selection condition is not met. The erase counts of the virtual block VB1 and the virtual block VB4 are less than the first threshold, and the difference between the hot id and the max hot id is greater than the second threshold, such that the selection condition is met. Therefore, the virtual block VB1 and the virtual block VB4 are determined as the first virtual blocks, and the virtual block VB1 and the virtual block VB4 are divided into a source virtual block pool (C pool) consisting of all the first virtual blocks. The virtual blocks in the source virtual block pool (C pool) simultaneously meet the selection conditions of the (C pool) and the (A pool), such that the virtual blocks belong to the source virtual block pool (C pool) and the block pool (A pool), and the virtual blocks in the source virtual block pool (C pool) all have the characteristics that the number of times for erasing is less and the data stored is cold data.

S202: determining, as the second virtual block, the virtual block with an erase count being greater than a third threshold.

When the second virtual block is selected, all the virtual blocks located in the idle pool may be selected, the selection condition is that the erase count is greater than the third threshold, and the third threshold is a sum of the erase count of the block with the minimum erase count in the data pool (A pool) and the preset threshold. Then the virtual blocks in the idle pool that meets the selection condition are selected according to the selection condition.

In an example, referring to FIG. 11 and FIG. 12, at the first phase, i.e., before data movement is performed, the virtual blocks VB5, VB6, and VB7 are all located in the idle pool (B pool) because the virtual blocks do not store data. Then the virtual blocks VB5, VB6, and VB7 of the idle pool are selected according to a relationship between the erase count and the third threshold.

For example, the erase count ($EC_{min\_usd\_VB}$) of the block with the minimum erase count in the data pool (A pool) may be 60, the preset threshold ($EC_{gap\_TH}$) may be 40, then the third threshold may be 100; the erase count of the virtual block VB5 is 180; the erase count of the virtual block VB6 is 90; and the erase count of the virtual block VB7 is 170. Therefore, the erase count of the virtual block VB6 is less than the third threshold, such that the selection condition is not met. The erase counts of the virtual block VB5 and the virtual block VB7 are greater than the third threshold, such that the selection condition is met. Therefore, the virtual block VB5 and the virtual block VB7 are determined as the second virtual blocks, and the virtual block VB5 and the virtual block VB7 are divided into a target virtual block pool (D pool) consisting of all the second virtual blocks. The virtual blocks in the target virtual block pool (D pool) simultaneously meet the selection conditions of the (D pool) and the (B pool), such that the virtual blocks belong to the target virtual block pool (D pool) and the idle pool (B pool), and the virtual blocks in the target virtual block pool (D pool) all have the characteristics of being high in the number of times for erasing and having no data stored therein.

After the first virtual block and the second virtual block are selected, the data stored in the first virtual block may be moved to the second virtual block, such that the first virtual block is set from a use state to an idle state; and the first virtual block in the idle state may be configured to store newly-written data.

In an example, referring to FIG. 11 and FIG. 12, at a second phase, after the data movement operation is triggered, data movement may be performed, and one first virtual block is randomly selected from the source virtual block pool (C pool), for example, the virtual block VB1 is selected as the source virtual block, and then one second virtual block is randomly selected from the target virtual block pool (D pool), for example, the virtual block VB5 is selected as the target virtual block. Then the data stored in the virtual block VB1 is moved to the virtual block VB5, and the erase operation is performed on the virtual block VB1. Furthermore, the virtual block VB1 is divided into the idle pool (B pool) from the block pool (A pool), and the virtual block VB5 is divided into the block pool (A pool) from the idle pool (B pool). The first virtual block is set from the use state to the idle state, and the first virtual block may be configured to store the newly-written data, such that the probability of the virtual blocks with less number of times for erasing used may be increased, and the difference between the erase counts of the virtual blocks is shortened, thereby achieving an effect of wear leveling.

Figure 13:
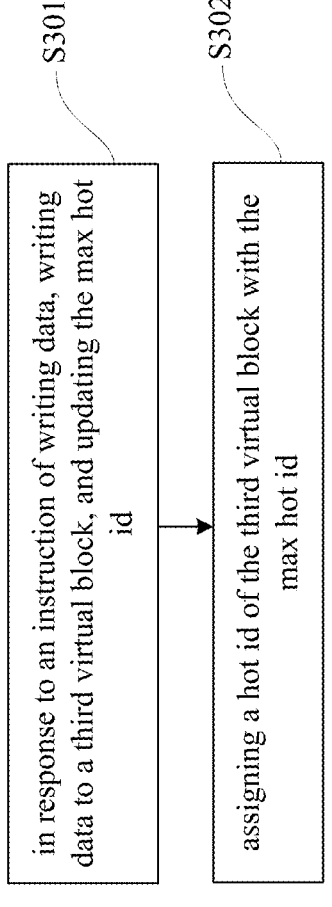
FIG. 13 is a flow diagram of another method of operating a memory system provided by examples of the present disclosure.

A data movement process of the virtual blocks is described in the above-mentioned examples, and when new data is written to the virtual blocks, the hot ids of the virtual blocks may be updated. Referring to FIG. 13, in an implementation, before the erase count and hot id of each virtual block are obtained, the method further comprises the following operations:

S301: in response to an instruction of writing data, writing data to a third virtual block, and updating the max hot id.

The memory controller receives an instruction of writing data, and executes a write operation, such that a new virtual block is used, and the third virtual block selected for storing the newly-written data is a virtual block in the idle pool; if the third virtual block has never been written with user data, a current hot id of the third virtual block is 0; and if the third virtual block used to store the user data, the current hot id of the third virtual block is a hot id assigned when the third virtual block executes a storage task the last time. While the data is written to the third virtual block, the max hot id may be updated according to an amount of data being written and a data storage mode of the third virtual block.

S302: assigning a hot id of the third virtual block with the max hot id.

After the max hot id is updated, the updated max hot id is assigned to the third virtual block to update the hot id of the third virtual block, such that the third virtual block has the max hot id, and it also represents that data currently written to the third virtual block is the hottest data.

Figure 14:
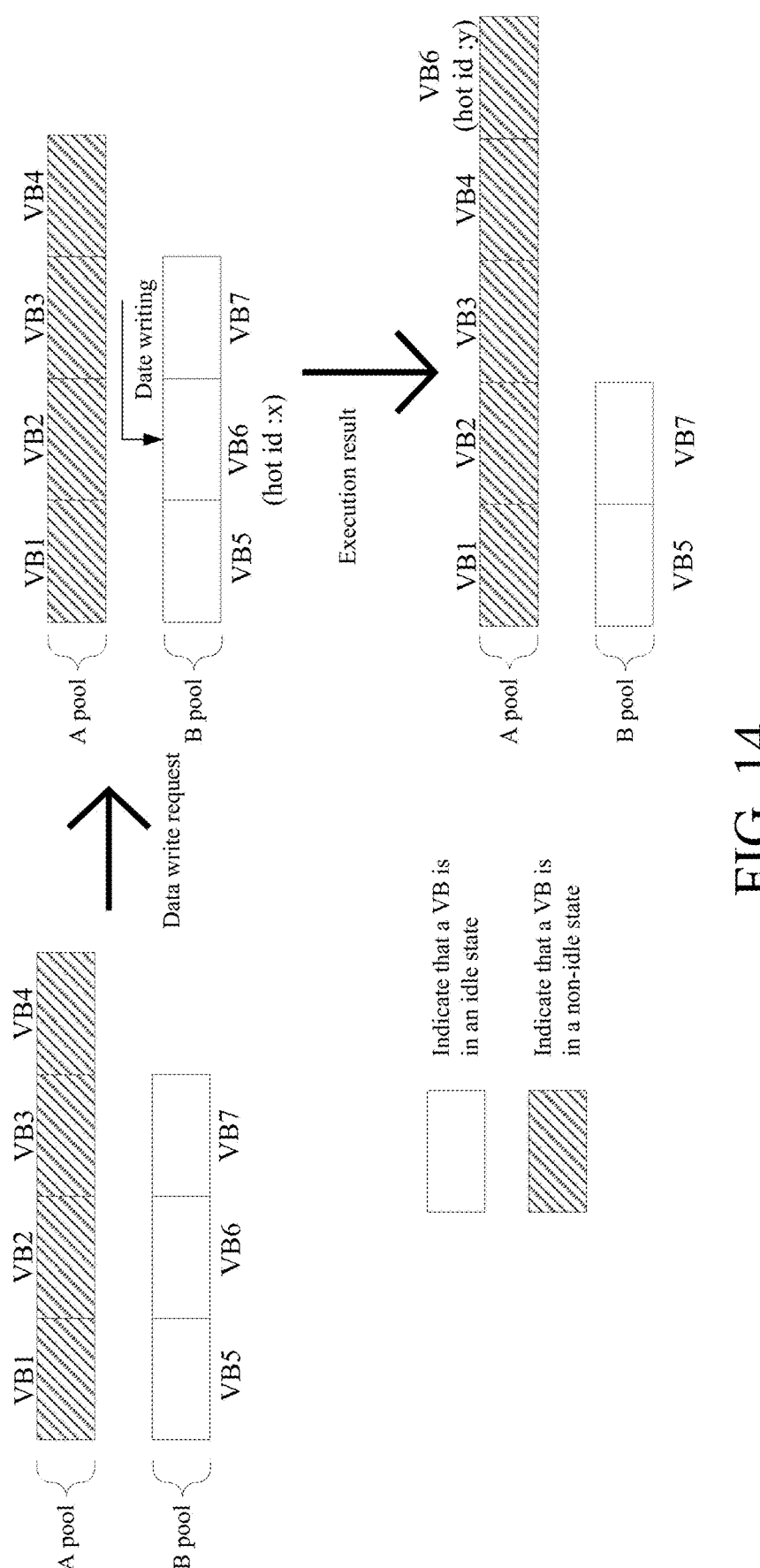
FIG. 14 is a schematic diagram of a data write process provided by examples of the present disclosure.

In an example, referring to FIG. 14, when the host detects a data write request, one third virtual block is randomly selected from the B pool, for example, the virtual block VB6 is selected to store the newly-written data, after data write is completed, the hot id of the virtual block VB6 is updated from x to the current max hot id y, and the virtual block VB6 is moved from the B pool to the A pool.

The third virtual block is the virtual block in the idle pool; and in one example, a process of selecting the third virtual block from the idle pool comprises: determining, as the third virtual block, the virtual block which is in an idle state and has the smallest erase count.

In an example, the virtual blocks VB5, VB6, and VB7 are all located in the idle pool (B pool) because the virtual blocks do not store data. The erase counts of the virtual blocks VB5, VB6, and VB7 respectively are 40, 20, and 30. It can be seen that, the erase count of the virtual block VB6 is the smallest, such that the virtual block VB6 is used as the third virtual block to store the newly-written data, and the virtual blocks VB5 and VB7 cannot be used as the third virtual blocks to store the newly-written data.

When the max hot id is updated, an amount by which the max hot id is increased may be firstly determined, and then the updated max hot id is determined based on the max hot id before updating and the increased amount, for example, the max hot id before updating and the increased amount may be summed, and the summed value is determined as the updated max hot id.

The amount by which the max hot id is increased is related to the amount of data being written. In an implementation, when the data is written to the third virtual block, and the max hot id is updated, if the amount of data being written is the same, the amount by which the max hot id is increased is the same.

The amount by which in the max hot id is increased depends on the amount of data being written, i.e., the increased amount is determined based on the amount of data being written. Therefore, even if different modes of writing data are employed, if the amount of data being written is the same, the amount by which the max hot id is increased is the same.

In an example, when the amount of data being written is 100 MB, and if a first mode is employed for writing data, the number of the virtual blocks required is a, and the amount by which the max hot id is increased is A; and if a second mode is employed for writing, the number of the virtual blocks required is b, but the amount by which the max hot id is increased is also A.

In an implementation of the present disclosure, a relationship between the amount by which the max hot id is increased and the mode of writing data may be that, when the mode of writing data is the first mode, the max hot id is increased by a first value, and when the mode of writing data is the second mode, the max hot id is increased by a second value.

For any virtual block, when different modes of writing data are employed, since data storage capacities for different modes are different, changing values of the max hot ids is not the same. In an example, the number of stored bits in the second mode is m times the number of stored bits in the first mode, and the second value is m+1 times the first value.

For example, when a triple level cell (TLC) mode (second mode) is employed to perform data writing, the max hot id is increased by 4 every time a new virtual block is to be occupied; and when a single level cell (SLC) mode (first mode) is employed to perform data writing, the max hot id is increased by 1 every time the new virtual block is to be occupied.

In an example, descriptions are continuously performed by using the first mode as the SLC mode and the second mode as the TLC mode. When the amount of data being written is 100 MB, and the TLC mode is employed to perform data writing, only one virtual block may be required to complete the writing of the data, such that the max hot id is increased by 4, and when the SLC mode is employed to perform data writing, three virtual blocks may be required to complete the writing of the data, such that the max hot id is increased by 3; and during data storage, the data in the three virtual blocks employing the SLC write mode is moved to one virtual block, and during the process, a new virtual block for data garbage collection (data GC) is required to be occupied, such that the max hot id is additionally increased by 1, i.e., the max hot id is increased by 4 in total. Therefore, even if different modes of writing data are employed, if the amount of data being written is the same, the amount by which the max hot id is increased is the same.

In the above-mentioned examples, descriptions are performed by using the second mode being the TLC mode, in other implementations of the examples of the present disclosure, the second mode may comprise any one of a multi level cell (MLC) mode, the TLC mode, a quad level cell (QLC) mode, or a PLC mode; and the second mode may comprise any one of the MLC mode, the QLC mode, or a penta level cell (PLC) mode, but the number of stored bits in the second mode is an integer multiple of the number of stored bits in the first mode.

It can be understood that, in regardless of which storage mode is employed by the memory or how many storage modes the memory supports, the amount by which the corresponding max hot id is increased may be set according to an integer multiple relationship between the number of stored bits in the mode and the number of stored bits in the SLC mode.

According to the method of operating a memory system provided by the present disclosure, the erase count and the hot id both are used as the selection conditions to achieve the selection of the virtual blocks; when the first virtual block is selected, the selection may be performed according to both of a relationship between the erase count and the preset threshold, and a relationship between the difference between the hot id and the max hot id and the preset threshold; and when the second virtual block is selected, the selection may be performed according to the relationship between the erase count and the preset threshold. In an aspect, the occurrence of a situation, that the virtual block storing hot data is selected and the data stored in the virtual block is moved, is avoided, such that the possibility of a write amplification phenomenon is reduced, thereby extending the service life of the solid state drive. In another aspect, the probability of the virtual blocks with small number of times for erasing used may be increased, and the difference between the erase counts of the virtual blocks is shortened, thereby achieving an effect of wear leveling, and extending the service life of the solid state drive.

The examples of the present disclosure further provide a memory controller 111, for example, may be the aforementioned memory controller 111 shown in FIG. 6. The memory controller 111 comprises a processor 211, a host interface circuit 212, a data buffering circuit 213, an ECC module 214, a garbage collection module 215, a wear leveling module 216, and a memory interface circuit 217; and the memory controller 111 is coupled with a memory 112. In an example, the processor 211 is connected with a host 100 through the host interface circuit 212; the memory interface circuit 217 is connected with the memory 112; and the data buffering circuit (buffer) 213 is configured to: store first data information and second data information, wherein an id and erase count of the virtual block are stored in the first data information, and the id and a hot id of the virtual block are stored in the second data information. The processor 211 is configured to obtain an erase count and hot id of each virtual block, wherein the hot id represents a hot degree of data stored in the corresponding virtual block; determine a first virtual block from which data is moved and a second virtual block into which the data is moved according to the erase count and the hot id of each virtual block, and move data stored in the first virtual block to the second virtual block.

In an implementation of the present disclosure, the processor 211 is configured to obtain the erase count of each virtual block from the first data information; and obtain the hot id of each virtual block from the second data information.

In an implementation of the present disclosure, the second data information further comprises a max hot id, and the max hot id is a maximum in the hot ids; and the processor 211 is configured to determine, as the first virtual block, the virtual block with an erase count being less than a first threshold and a hot id, wherein a difference between the hot id and the max hot id is greater than a second threshold; and determine, as the second virtual block, the virtual block with an erase count being greater than a third threshold.

In an implementation of the present disclosure, the memory controller further comprises a host interface circuit, and the host interface circuit is configured to connect a host; and the processor 211 is configured to in response to the instruction of writing data received by the host interface circuit, write data to a third virtual block, and update the max hot id, assign a hot id of the third virtual block with the max hot id.

In an implementation of the present disclosure, the processor 211 is further configured to determine, as the third virtual block, the virtual block which is in an idle state and has the minimum erase count.

In an implementation of the present disclosure, the processor 211 is further configured to cause the amount of data to be written to be the same, the amount increased to the max hot id is the same.

In an implementation of the present disclosure, the processor 211 is further configured to determine a data storage mode of the third virtual block, wherein the data storage mode comprises a first mode and a second mode, and the number of stored bits in the second mode is m times the number of stored bits in the first mode; increase a maximum hot type id of data by a first value when the data storage mode of the third virtual block is the first mode; and increase a maximum hot type id of data by a second value when the data storage mode of the third virtual block is the second mode, wherein the second value is m+1 times the first value.

The examples of the present disclosure further provide a memory system, which comprises a memory 112 and a memory controller 111, wherein the memory controller 111 is coupled to the memory 112 through a flash interface circuit 217; and the memory controller 111 is configured to obtain an erase count and hot id of each virtual block, wherein the hot id represents a hot degree of data stored in the corresponding virtual block; determine a first virtual block from which data is moved and a second virtual block into which the data is moved according to the erase count and the hot id of each virtual block, and move data stored in the first virtual block to the second virtual block.

In an implementation of the present disclosure, the memory controller 111 stores first data information and second data information, wherein the first data information comprises an id and erase count of the virtual block, and the second data information comprises the id and a hot id of the virtual block; and the memory controller 111 is configured to obtain the erase count of each virtual block through the flash interface circuit from the first data information; and obtain the hot id of each virtual block through the flash interface circuit from the second data information.

In an implementation of the present disclosure, the second data information further comprises a max hot id, and the max hot id is a maximum in the hot ids; and the memory controller 111 is configured to determine, as the first virtual block, the virtual block with an erase count being less than a first threshold and a hot id, wherein a difference between the hot id and the max hot id is greater than a second threshold; and determine, as the second virtual block, the virtual block with an erase count being greater than a third threshold.

In an implementation of the present disclosure, the memory controller 111 further comprises a host interface circuit, and the host interface circuit is configured to connect a host; and the memory controller 111 is further configured to in response to the instruction of writing data received by the host interface circuit, write data to a third virtual block, and update the max hot id, assign a hot id of the third virtual block with the max hot id.

In an implementation of the present disclosure, the memory controller 111 is further configured to determine, as the third virtual block, the virtual block which is in an idle state and has the minimum erase count.

In an implementation of the present disclosure, the memory controller 111 is further configured to cause the amount increased to the max hot id to be the same, if the amount of data to be written is the same.

In an implementation of the present disclosure, the memory controller 111 is further configured to determine a data storage mode of the third virtual block, wherein the data storage mode comprises a first mode and a second mode, and the number of stored bits in the second mode is m times the number of stored bits in the first mode; increase a maximum hot type id of data by a first value when the data storage mode of the third virtual block is the first mode; and increase a maximum hot type id of data by a second value when the data storage mode of the third virtual block is the second mode, wherein the second value is m+1 times the first value.

The memory controller provided by the examples of the present disclosure may comprise a cache and one or more processors; a computer-executable instruction is stored in the cache; and the one or more processors execute the computer-executable instruction to implement the method of operating a memory system of the present disclosure.

The examples of the present disclosure further provide an electronic apparatus. The electronic apparatus comprises a host and the aforementioned memory system, wherein the host is connected with the memory system for storing or reading data to or from the memory system. In an example, the electronic apparatus may be the aforementioned electronic apparatus shown in FIG. 1.

This example provides a computer-readable storage medium having a computer program stored thereon, and the computer program is used for implementing the method of operating a memory system of the present disclosure.

Examples of the present disclosure provide a method of operating a memory system, a memory controller, a memory system, and a storage medium.

In order to achieve the above-mentioned objective, the examples of the present disclosure employ the following technical solutions:

A first aspect provides a method of operating a memory system. The method comprises: obtaining an erase count and hot id of each virtual block, wherein the hot id represents a hot degree of data stored in the corresponding virtual block; determining a first virtual block from which data is moved and a second virtual block into which the data is moved according to the erase count and the hot id of each virtual block, and moving data stored in the first virtual block to the second virtual block.

According to the method of operating a memory system provided by the examples of the present disclosure, the virtual blocks are selected according to both of the erase count and the hot id. In an aspect, the occurrence of a situation that the virtual block storing hot data is selected is avoided, such that the possibility of a write amplification (WA) phenomenon is reduced, thereby extending the service life of the solid state drive. In another aspect, cold data may be moved from the first virtual block to the second virtual block more accurately, such that the accuracy of movement of data stored in the virtual block is improved.

In some examples, obtaining the erase count and hot id of each virtual block comprises: obtaining an erase count of each virtual block from first data information, wherein the first data information comprises the id and erase count of the virtual block; and obtaining a hot id of each virtual block from second data information, wherein the second data information comprises an id and hot id of the virtual block.

In some examples, the second data information further comprises a max hot id, and the max hot id is a maximum in the hot ids; and determining the first virtual block from which data is moved and the second virtual block into which the data is moved according to the erase count and the hot id of each virtual block comprises: determining, as the first virtual block, the virtual block with an erase count being less than a first threshold and a hot id, wherein a difference between the hot id and the max hot id is greater than a second threshold; and determining, as the second virtual block, the virtual block with an erase count being greater than a third threshold.

In some examples, the method further comprises: in response to an instruction of writing data, writing data to a third virtual block, and updating the max hot id, assigning a hot id of the third virtual block with the max hot id.

In some examples, before writing the data to the third virtual block in response to the instruction of writing data, and updating the max hot id, the method further comprises: determining, as the third virtual block, the virtual block which is in an idle state and has the minimum erase count.

In some examples, if the amount of data being written is the same, the amount by which the max hot id is increased is the same.

In some examples, writing the data to the third virtual block, and updating the max hot id comprises: determining a data storage mode of the third virtual block, wherein the data storage mode comprises a first mode and a second mode, and the number of stored bits in the second mode is m times the number of stored bits in the first mode; increasing a maximum hot type id of data by a first value when the data storage mode of the third virtual block is the first mode; and increasing a maximum hot type id of data by a second value when the data storage mode of the third virtual block is the second mode, wherein the second value is m+1 times the first value.

In some examples, before determining the first virtual block from which data is moved and the second virtual block into which the data is moved, the method further comprises: determining a relationship between a difference between the maximum erase count and the minimum erase count of the virtual block and a fourth threshold; and in response to the difference between the maximum erase count and the minimum erase count of the virtual block being greater than the fourth threshold, determining the first virtual block from which data is moved and the second virtual block into which the data is moved.

In a second aspect, a memory controller is provided, which comprises a buffer and a processor; and the buffer is configured to: store first data information and second data information, wherein an id and an erase count of the virtual block are stored in the first data information, and the id and a hot id of the virtual block are stored in the second data information. The processor is coupled with the buffer and configured to: obtain an erase count and hot id of each virtual block, wherein the hot id represents a hot degree of data stored in the corresponding virtual block; determine a first virtual block from which data is moved and a second virtual block into which the data is moved according to the erase count and the hot id of each virtual block, and move data stored in the first virtual block to the second virtual block.

In some examples, the processor is configured to: obtain the erase count of each virtual block from the first data information; and obtain the hot id of each virtual block from the second data information.

In some examples, the second data information further comprises a max hot id, and the max hot id is a maximum in the hot ids; and the processor is configured to: determine, as the first virtual block, the virtual block with an erase count being less than a first threshold and a hot id, wherein a difference between the hot id and the max hot id is greater than a second threshold; and determine, as the second virtual block, the virtual block with an erase count being greater than a third threshold.

In some examples, the memory controller further comprises a host interface circuit configured to receive an instruction of writing data; and the processor is further configured to: in response to the instruction of writing data received by the host interface circuit, write data to a third virtual block, and update the max hot id, assign a hot id of the third virtual block with the max hot id.

In some examples, the processor is further configured to: determine, as the third virtual block, the virtual block which is in an idle state and has the minimum erase count.

In some examples, the processor is further configured to: if the amount of data being written is the same, cause the amount by which the max hot id is increased to be the same.

In some examples, the processor is further configured to: determine a data storage mode of the third virtual block, wherein the data storage mode comprises a first mode and a second mode, and the number of stored bits in the second mode is m times the number of stored bits in the first mode; increase a maximum hot type id of data by a first value when the data storage mode of the third virtual block is the first mode; and increase a maximum hot type id of data by a second value when the data storage mode of the third virtual block is the second mode, wherein the second value is m+1 times the first value.

In some examples, the processor is further configured to: determine a relationship between a difference between the maximum erase count and the minimum erase count of the virtual block and a fourth threshold; and in response to the difference between the maximum erase count and the minimum erase count of the virtual block being greater than the fourth threshold, determine the first virtual block from which data is moved and the second virtual block into which the data is moved.

In a third aspect, a memory system is provided, which comprises: a memory comprising a plurality of blocks; and a memory controller coupled to the memory through a flash interface circuit, wherein the memory controller is configured to: obtain an erase count and hot id of each virtual block, wherein each virtual block comprises at least one block, and the hot id represents a hot degree of data stored in the corresponding virtual block; determine a first virtual block from which data is moved and a second virtual block into which the data is moved according to the erase count and the hot id of each virtual block, and move data stored in the first virtual block to the second virtual block.

In some examples, first data information and second data information are stored in the memory controller, wherein the first data information comprises an id and erase count of the virtual block, the second data information comprises the id and a hot id of the virtual block; and the memory controller is configured to: obtain the erase count of each virtual block from the first data information; and obtain the hot id of each virtual block from the second data information.

In some examples, the second data information further comprises a max hot id, and the max hot id is a maximum in the hot ids; and the memory controller is configured to: determine, as the first virtual block, the virtual block with an erase count being less than a first threshold and a hot id, wherein a difference between the hot id and the max hot id is greater than a second threshold; and determine, as the second virtual block, the virtual block with an erase count being greater than a third threshold.

In some examples, the memory controller further comprises a host interface circuit, and the host interface circuit is configured to connect a host; and the memory controller is configured to: in response to the instruction of writing data received by the host interface circuit, write data to a third virtual block, and update the max hot id, assign a hot id of the third virtual block with the max hot id.

In some examples, the memory controller is further configured to determine, as the third virtual block, the virtual block which is in an idle state and has the minimum erase count.

In some examples, the memory controller is further configured to if the amounts of data to be written are the same, cause the amounts increased to the max hot id to be the same.

In some examples, the memory controller is further configured to: determine a data storage mode of the third virtual block, wherein the data storage mode comprises a first mode and a second mode, and the number of stored bits in the second mode is m times the number of stored bits in the first mode; increase a maximum hot type id of data by a first value when the data storage mode of the third virtual block is the first mode; and increase a maximum hot type id of data by a second value when the data storage mode of the third virtual block is the second mode, wherein the second value is m+1 times the first value.

In some examples, the memory controller is further configured to: determine a relationship between a difference between the maximum erase count and the minimum erase count of the virtual block and a fourth threshold; and in response to the difference between the maximum erase count and the minimum erase count of the virtual block being greater than the fourth threshold, determine the first virtual block from which data is moved and the second virtual block into which the data is moved.

In a fourth aspect, a computer-readable storage medium is provided, wherein the computer-readable storage medium stores computer-executable instructions; and when the computer-executable instructions are executed, any one of methods in the above-mentioned first aspect may be implemented.

In a fifth aspect, an electronic apparatus is provided, which comprises a host and the memory system provided in the third aspect, wherein the host is connected with the memory system, so as to write data to the memory system or read data stored in the memory system.

It may be understood that the technical effects of the second aspect to the fifth aspect may be referred to that of the first aspect or any implementation thereof, which is not repeated herein.

Those skilled in the art can clearly appreciate that, for ease and simplicity of description, in the above examples, the descriptions of various examples have their own emphases, and the portions of some example that are not described in detail may be referred to a corresponding process in the aforementioned method examples, which is no longer repeated herein.

In several examples provided by the present disclosure, it should be understood that the provided program method and memory may be implemented by other manners. For example, the division of some module is only a logical functional division. In a real implementation, there may be another manner for division. For example, a plurality of units or components may be combined, or may be integrated into another system, or some features can be ignored or not performed.

Those of ordinary skill in the art can recognize that the modules and algorithm processes of various examples as described in conjunction with the examples disclosed herein can be implemented in an electronic hardware, or a combination of a computer software and an electronic hardware. Whether these functions are performed through a hardware or a software depends on particular applications and design constraints of the technical solution. Professional technicians can implement the described function using different methods for each particular application, but such implementation should not be considered as exceeding the scope of the present disclosure.

The above descriptions are merely specific implementations of the present disclosure, and the protection scope of the present disclosure is not limited to these. Any variation or replacement that may be readily figured out by those skilled in the art within the technical scope disclosed by the present disclosure shall fall within the protection scope of the present disclosure. Therefore, the protection scope of the present disclosure shall be defined by the protection scope of the claims.

What is claimed is:

1. A method of operating a memory system, comprising:
   obtaining an erase count and a hot id of a virtual block, wherein the hot id represents a hot degree of data stored in the corresponding virtual block;
   determining a relationship between a difference between a maximum erase count and a minimum erase count of the virtual block and a threshold;
   in response to the difference between the maximum erase count and the minimum erase count of the virtual block being greater than the threshold, determining a first virtual block from which data is moved and a second virtual block into which the data is moved according to the erase count and the hot id of the virtual block; and
   moving the data stored in the first virtual block to the second virtual block, wherein the movement of the data configures the second virtual block into an idle state and configures the first virtual block into a use state.

2. The method of claim 1, wherein the obtaining the erase count and the hot id of the virtual block includes:
   obtaining the erase count of the virtual block from first data information, wherein the first data information includes an id and the erase count of the virtual block; and
   obtaining the hot id of the virtual block from second data information, wherein the second data information includes the id and the hot id of the virtual block.

3. The method of claim 2, wherein the second data information further includes a max hot id, and the max hot id is a maximum in hot ids, and the determining the first virtual block from which the data is moved and the second virtual block into which the data is moved according to the erase count and the hot id of the virtual block includes:
   determining, as the first virtual block, the virtual block with the erase count being less than a first threshold and the hot id, wherein a difference between the hot id and the max hot id is greater than a second threshold; and
   determining, as the second virtual block, the virtual block with the erase count being greater than a third threshold.

4. The method of claim 1, further including:
   in response to an instruction of writing the data, writing the data to a third virtual block, and updating a max hot id; and
   assigning the hot id of the third virtual block with the max hot id.

5. The method of claim 4, wherein before writing the data to the third virtual block in response to the instruction of writing the data, and updating the max hot id, the method further includes determining, as the third virtual block, the virtual block which is in the idle state and has the minimum erase count.

6. The method of claim 4, wherein if an amount of the data being written is the same, an amount by which the max hot id is increased is the same.

7. The method of claim 6, wherein writing the data to the third virtual block, and updating the max hot id includes:
   determining a data storage mode of the third virtual block, wherein the data storage mode includes a first mode and a second mode, and a number of stored bits in the second mode is m times a number of stored bits in the first mode;

increasing a maximum hot type id of data by a first value when the data storage mode of the third virtual block is the first mode; and increasing the maximum hot type id of data by a second value when the data storage mode of the third virtual block is the second mode, wherein the second value is m+1 times the first value.

8. A memory controller, comprising:

a buffer configured to:

store first data information and second data information, wherein an id and erase count of a virtual block are stored in the first data information, the id and a hot id of the virtual block are stored in the second data information, and the hot id represents a hot degree of data stored in the corresponding virtual block; and a processor coupled with the buffer, and configured to:

obtain the erase count and the hot id of the virtual block;

determine a relationship between a difference between a maximum erase count and a minimum erase count of the virtual block and a threshold;

in response to the difference between the maximum erase count and the minimum erase count of the virtual block being greater than the threshold, determine a first virtual block from which data is moved and a second virtual block into which the data is moved according to the erase count and the hot id of the virtual block; and move the data stored in the first virtual block to the second virtual block, wherein the movement of the data configures the second virtual block into an idle state and configures the first virtual block into a use state.

9. The memory controller of claim 8, wherein to obtain the erase count and the hot id of the virtual block the processor is configured to:

obtain the erase count of the virtual block from the first data information; and obtain the hot id of the virtual block from the second data information.

10. The memory controller of claim 9, wherein the second data information further includes a max hot id, and the max hot id is a maximum in the hot ids, and to determine the first virtual block from which the data is moved and the second virtual block into which the data is moved according to the erase count and the hot id of the virtual block the processor is configured to:

determine, as the first virtual block, the virtual block with the erase count being less than a first threshold and the hot id, wherein a difference between the hot id and the max hot id is greater than a second threshold; and determine, as the second virtual block, the virtual block with the erase count being greater than a third threshold.

11. The memory controller of claim 8, further including a host interface circuit configured to receive an instruction of writing the data, wherein the processor is further configured to:

in response to the instruction of writing the data received by the host interface circuit, write the data to a third virtual block, and update a max hot id; and assign the hot id of the third virtual block with the max hot id.

12. The memory controller of claim 11, wherein before writing the data to the third virtual block in response to the instruction of writing the data the processor is further configured to determine, as the third virtual block, the virtual block which is in the idle state and has the minimum erase count.

13. The memory controller of claim 11, wherein if an amount of the data being written is the same, an amount by which the max hot id is increased is the same.

14. The memory controller of claim 13, wherein the processor is further configured to:

determine a data storage mode of the third virtual block, wherein the data storage mode comprises a first mode and a second mode, and a number of stored bits in the second mode is m times a number of stored bits in the first mode;

increase a maximum hot type id of data by a first value when the data storage mode of the third virtual block is the first mode; and increase the maximum hot type id of data by a second value when the data storage mode of the third virtual block is the second mode, wherein the second value is m+1 times the first value.

15. A memory system, comprising:

a memory including a plurality of blocks, and a memory controller coupled to the memory through a flash interface circuit, and configured to:

obtain an erase count and a hot id of a virtual block, wherein the virtual block includes at least one block, and the hot id represents a hot degree of data stored in the corresponding virtual block;

determine a relationship between a difference between a maximum erase count and a minimum erase count of the virtual block and a threshold;

in response to the difference between the maximum erase count and the minimum erase count of the virtual block being greater than the threshold, determine a first virtual block from which data is moved and a second virtual block into which the data is moved according to the erase count and the hot id of the virtual block; and move the data stored in the first virtual block to the second virtual block, wherein the movement of the data configures the second virtual block into an idle state and configures the first virtual block into a use state.

16. The memory system of claim 15, wherein first data information and second data information are stored in the memory controller, wherein the first data information comprises an id and the erase count of the virtual block, the second data information includes the id and the hot id of the virtual block and to obtain the erase count and the hot id of the virtual block the memory controller is configured to:

obtain the erase count of the virtual block from the first data information; and obtain the hot id of the virtual block from the second data information.

17. The memory system of claim 16, wherein the second data information further includes a max hot id, and the max hot id is a maximum in the hot ids and to determine the first virtual block from which the data is moved and the second virtual block into which the data is moved according to the erase count and the hot id of the virtual block the memory controller is configured to:

determine, as the first virtual block, the virtual block with the erase count being less than a first threshold and the hot id, wherein a difference between the hot id and the max hot id is greater than a second threshold; and determine, as the second virtual block, the virtual block with the erase count being greater than a third threshold.

18. The memory system of claim 15, wherein the memory controller further includes a host interface circuit configured to connect a host, and the host interface circuit is configured to receive an instruction of writing the data, and the memory controller is configured to:

in response to the instruction of writing the data received by the host interface circuit, write the data to a third virtual block, and update a max hot id; and assign the hot id of the third virtual block to the max hot id.

19. The memory system of claim 18, wherein before writing the data to the third virtual block in response to the instruction of writing the data the memory controller is further configured to determine, as the third virtual block, the virtual block which is in the idle state and has the minimum erase count.

20. The memory system of claim 18, wherein if an amount of the data being written is the same, an amount by which the max hot id is increased is the same.

* * * * *